Dec. 3, 1968  W. L. RENDESSY  3,414,295

TWO-WAY FRICTION CONTROL HITCH

Filed Sept. 9, 1966

INVENTOR.
WILLIAM L. RENDESSY.
BY
Willard S. Groene
ATTORNEY.

United States Patent Office 3,414,295
Patented Dec. 3, 1968

3,414,295
TWO-WAY FRICTION CONTROL HITCH
William L. Rendessy, 1230 E. Mercer Lane,
Phoenix, Ariz. 85020
Filed Sept. 9, 1966, Ser. No. 578,185
2 Claims. (Cl. 280—511)

This invention pertains to improvements in trailer hitches and is particularly directed to an improved two-way friction control hitch particularly adapted to conventional ball hitches.

One of the objects of this invention is to provide frictional restraint for a trailer hitch in both the vertical axis of the ball hitch and in the longitudinal horizontal axis of relative tilting of the towing and trailer vehicles.

Still another object is to provide adjustable friction means for restraining the pivotal movements of a ball hitch for a trailer in both vertical and horizontal swinging movements.

Further features and advantages of this invention will appear from a detailed description of the drawings in which.

Figure 2:
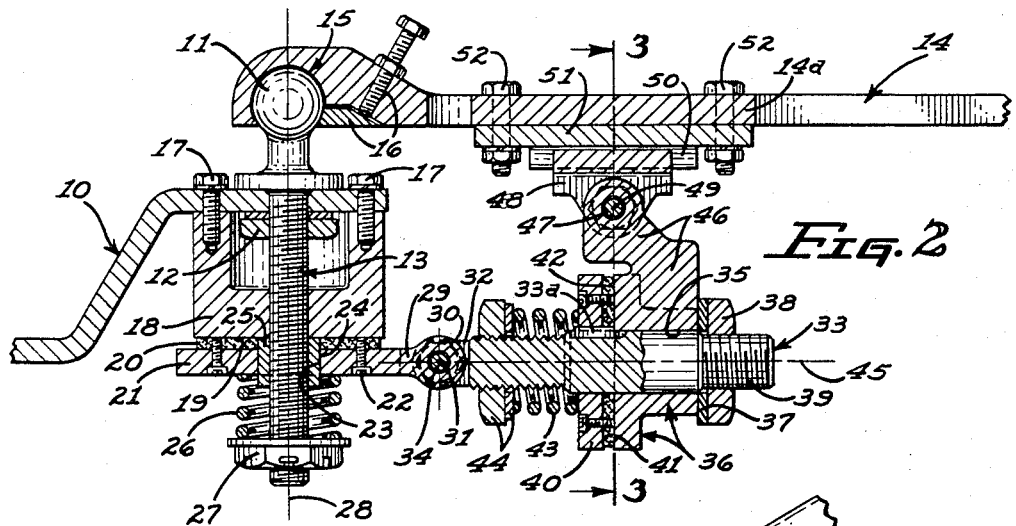
FIG. 2 is a sectional view on the line 2—2 of FIG. 1.
Figure 1:
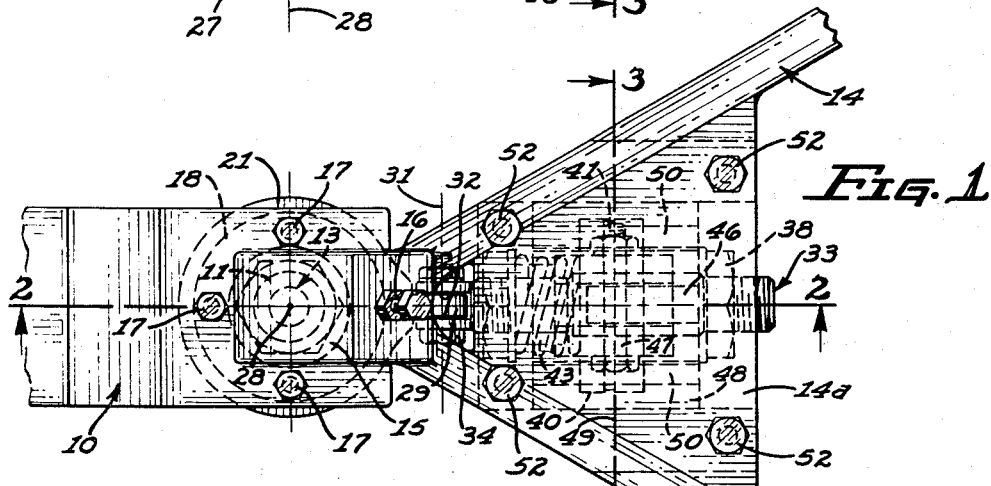
FIG. 1 is a plan view of a two-way friction control apparatus for a ball hitch for a trailer incorporating the features of this invention.
Figure 3:
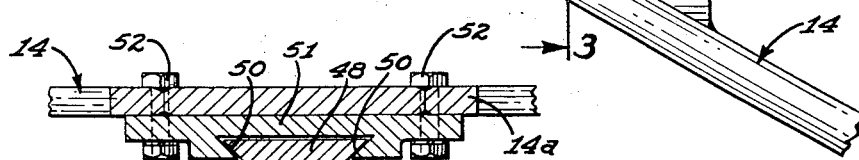
FIG. 3 is a sectional view on the line 3—3 of FIGS. 1 and 2.
Figure 3:
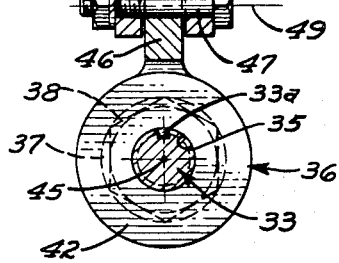

As an example of one embodiment of this invention there is shown a trailer hitch arrangement comprising the usual hitch bracket 10 suitably fixed to the towing vehicle, not shown, having the regular hitch ball 11 rigidly fixed to the bracket 10 by a suitable lock nut 12 carried on the threaded shank 13 of the hitch ball 11. Fixed to the trailer tongue 14 is the usual ball socket 15 with its usual releasable securing means 16.

Fixed to the hitch bracket 10 by suitable screws 17 is clutch hub 18 having the radially disposed friction surface 19 arranged to be engaged by the friction disc 20 fixed to the clutch disc 21 by suitable screws 22. The clutch disc 21 has a bore 23 axially slidable on the outside diameter 24 of a sleeve 25 threadedly mounted on the threaded shank 13 of the hitch ball 11. A compression spring 26 surrounds the sleeve 25 adjacent the clutch disc 21 and is engaged by the lock nut 27 mounted on the threaded shank 13 of the hitch ball 11 so as to yieldingly normally urge the friction disc 20 against the friction surface 19 of the clutch hub 18 to frictionally restrain relative movement of the hitch bracket and hitch ball shank 13 relative to the clutch disc 21 around the vertical axis 28.

Rigidly fixed to the clutch disc 21 is a radially extending lug 29 having a bore 30 defining a transverse horizontal axis 31 which is received in the bifurcated end 32 of a longitudinally horizontally extending shaft 33, a bolt 34 pivotally interconnecting the clutch disc 21 and shaft 33 for rocking around the vertical axis 28. The shaft 33 is slidably and rotatably mounted in a bore 35 formed in the brake drum housing 36 and restrained from forward movement therein by a thrust washer 37 and a lock nut 38 carried on the threaded rear end portion 39 of the shaft 33. Axially slicable on but restrained against rotation relative to the shaft 33 by a suitable key 33a is a second clutch disc 40 having a suitable friction disc facing 41 suitably fixed thereto arranged to frictionally engage the radially disposed friction surface 42 on the brake drum housing 36.

A compression spring 43 surrounding the shaft 33 and confined between the clutch disc 40 and a washer and lock nut 44 threadedly mounted on the forward end of the shaft 33 serves to yieldingly urge the friction disc facing 41 toward the friction surface 42 of the brake drum housing 36 so as to frictionally restrain relative rotation of the shaft 33 and the brake drum housing 36 about the longitudinal horizontal axis 45.

The brake drum housing 36 has an integral lug 46 which is pivotally connected by a bolt 47 to a horizontally longitudinally moving slide 48 so as to rock about the horizontal transverse axis 49 relative thereto. The slide 48 is mounted on suitable dove-tail guideways 50 on the guide block 51 which is rigidly fixed to the trailer tongue connecting plate 14a by suitable bolts 52. Thus, by this arrangement restraint of relative swinging of the hitch bracket 10 and the trailer tongue about the axes 28 and 45 may be frictionally restrained to substantially reduce jack-knifing and back-and-forth swaying between the towing vehicle and the trailer being towed.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A two-way friction control hitch comprising in combination:
  (A) a hitch ball mounted on a towing vehicle.
  (B) a ball socket operatively connected to said hitch ball mounted on the vehicle to be towed,
  (C) means interconnected between said towing vehicle and the vehicle to be towed to restrain pivotal movement between said ball and socket about a vertical axis through said ball and about a longitudinal horizontal axis of sidewise relative tilting of said vehicles comprising,
  (D) a first friction clutch having,
  (E) a clutch hub fixed about a vertical axis to the towing vehicle,
  (F) a clutch disc rotatively journaled on said towing vehicle about said vertical axis to operatively engage said clutch hub,
  (G) a shaft pivotally connected to said clutch disc for relative rocking about a transverse horizontal axis,
  (H) a brake drum housing pivotally mounted on a horizontally longitudinally movable slide for relative rocking about a transverse horizontal axis on said slide,
  (I) means in said brake drum housing for rotatively supporting said shaft in said brake drum housing for rocking about a longitudinal horizontal axis,
  (J) a second friction clutch means operatively interconnected between said shaft and said brake drum housing,
  (K) and guideway means between said slide and said vehicle to be towed for longitudinal horizontal movement of said slide on said vehicle to be towed.

2. A friction control hitch comprising in combination:
  (A) a hitch ball mounted on a towing vehicle,
  (B) a ball socket operatively connected to said hitch ball mounted on the vehicle to be towed,
  (C) means interconnected between said towing vehicle and the vehicle to be towed to restrain pivotal movement between said ball and socket about a vertical axis through said ball and about a longitudinal horizontal axis of sidewise relative tilting of said vehicles comprising,
  (D) a first friction clutch having,
  (E) a clutch hub fixed about a vertical axis to the towing vehicle, (F) a clutch disc rotatively journaled on said towing vehicle about said vertical axis to operatively engage said clutch hub,
(G) a shaft pivotally connected to said clutch disc for relative rocking about a transverse horizontal axis,
(H) an element slidably mounted on the trailer tongue for longitudinal movement relative thereto, a member pivotally mounted on said element about a transverse horizontal axis,
(I) and means in the member for pivotally supporting the outer free end of said shaft for movement about a longitudinal horizontal axis to control side-wise relative tilting of the vehicle.

References Cited

UNITED STATES PATENTS

| | | | |
|---|---|---|---|
| 2,213,221 | 9/1940 | Johnson | 280—33.1 |
| 2,834,611 | 5/1958 | Chenette | 280—511 |
| 3,326,576 | 6/1967 | Kothmann | 280—511 |

BENJAMIN HERSH, *Primary Examiner.*

R. SONG, *Assistant Examiner.*